(12) United States Patent
Laible

(10) Patent No.: US 12,310,517 B2
(45) Date of Patent: May 27, 2025

(54) STACKING COLUMN

(71) Applicant: MTS Maschinenbau GmbH, Mengen (DE)

(72) Inventor: Eckhard Laible, Leinfelden-Schlechtenmühle (DE)

(73) Assignee: MTS Maschinenbau GmbH, Mengen (DE)

( * ) Notice: Subject to any disclaimer, the term of this patent is extended or adjusted under 35 U.S.C. 154(b) by 0 days.

(21) Appl. No.: 18/581,996

(22) Filed: Feb. 20, 2024

(65) Prior Publication Data

US 2024/0277162 A1    Aug. 22, 2024

(30) Foreign Application Priority Data

Feb. 20, 2023    (DE) ............ 10 2023 104 100.2
Feb. 15, 2024    (DE) ............ 10 2024 104 243.5

(51) Int. Cl.
*A47F 7/00* (2006.01)
*B65G 57/03* (2006.01)
*B65G 1/14* (2006.01)

(52) U.S. Cl.
CPC ............ *A47F 7/0007* (2013.01); *B65G 57/03* (2013.01); *A47F 7/0042* (2013.01); *B65G 1/14* (2013.01)

(58) Field of Classification Search
CPC .... A47F 7/0007; A47F 7/0014; A47F 7/0042; A47F 2005/165; A47F 5/16; A47F 5/12;
(Continued)

(56) References Cited

U.S. PATENT DOCUMENTS 3,384,266 A * 5/1968 Schuller .............. A47F 1/04
                                                  221/90
5,301,824 A * 4/1994 Schoeller ............ B65G 1/14
                                                  211/59.4

(Continued)

*Primary Examiner* — Devin K Barnett
(74) *Attorney, Agent, or Firm* — Bachman & LaPointe, P.C.

(57) ABSTRACT

The invention relates to a stacking column for storing stored goods one above the other or next to each other at mutual distances on a pawl (5.1-5.6), which is rotatably mounted between two side walls (1.1, 1.2) on an axle pin, wherein the two side walls (1.1, 1.2) form a U-body (3) with a common rear wall (2), wherein the U-body (3) comprises a foot plate (4), wherein the pawl has a linkage bolt (9), wherein the linkage bolt (9) is movable within a curved slot (8) of the side wall (1.1, 1.2) and thus mobilizes the pawl (5.1-5.6), wherein the linkage bolt (9) is extended through one of the side walls (1.1, 1.2), wherein the linkage bolt (9) slides from the ready position into the working position along an bevel (11) of a locking link (14) and thereby brings the locking link (14) from an initial position into a locking position, wherein the locking link (14) is moved between the side wall (1.1, 1.2) and a slider (19), wherein the locking link (14) has an axis of rotation (13) and a spring fixation (12), wherein a helical spring (20) is arranged between the spring fixation (12) and an anchor point (10), wherein the spring fixation (12) is arranged through a recess (15) of the slider (19) away from the locking link (14) through the recess (15) of the slider (19) and the coil spring (20) is arranged between the anchor point (10) and the spring fixation (12).

10 Claims, 4 Drawing Sheets

(58) Field of Classification Search
CPC .... B65G 57/00; B65G 57/03; B65G 90/0073; B65G 1/02; B65G 1/14; A47B 57/045
See application file for complete search history.

(56) References Cited

U.S. PATENT DOCUMENTS

| | | | | |
|---|---|---|---|---|
| 5,938,051 | A * | 8/1999 | Scholler | B65G 1/14 211/59.4 |
| 6,223,911 | B1 * | 5/2001 | Weaver | B65G 1/14 211/150 |
| 6,405,883 | B1 * | 6/2002 | Schambach | B65G 1/14 211/59.4 |
| 7,070,058 | B2 * | 7/2006 | Strobel | B65G 1/14 211/150 |
| 7,210,892 | B2 * | 5/2007 | Strobel | B65G 1/14 414/794.9 |
| 9,022,371 | B2 * | 5/2015 | Seghezzi | B65G 1/14 248/304 |
| 10,829,318 | B2 * | 11/2020 | Kreft | A47F 7/0014 |
| 2006/0226102 | A1 * | 10/2006 | Strobel | B65G 1/14 211/150 |
| 2007/0152544 | A1 * | 7/2007 | Strobel | B65G 1/14 312/9.58 |
| 2011/0062102 | A1 * | 3/2011 | Strobel | B65G 1/14 29/428 |
| 2019/0077602 | A1 * | 3/2019 | Giachero | B65G 1/14 |
| 2021/0061570 | A1 * | 3/2021 | Laible | B65G 1/14 |
| 2024/0278994 | A1 * | 8/2024 | Laible | B65G 1/14 |

* cited by examiner

Fig. 3
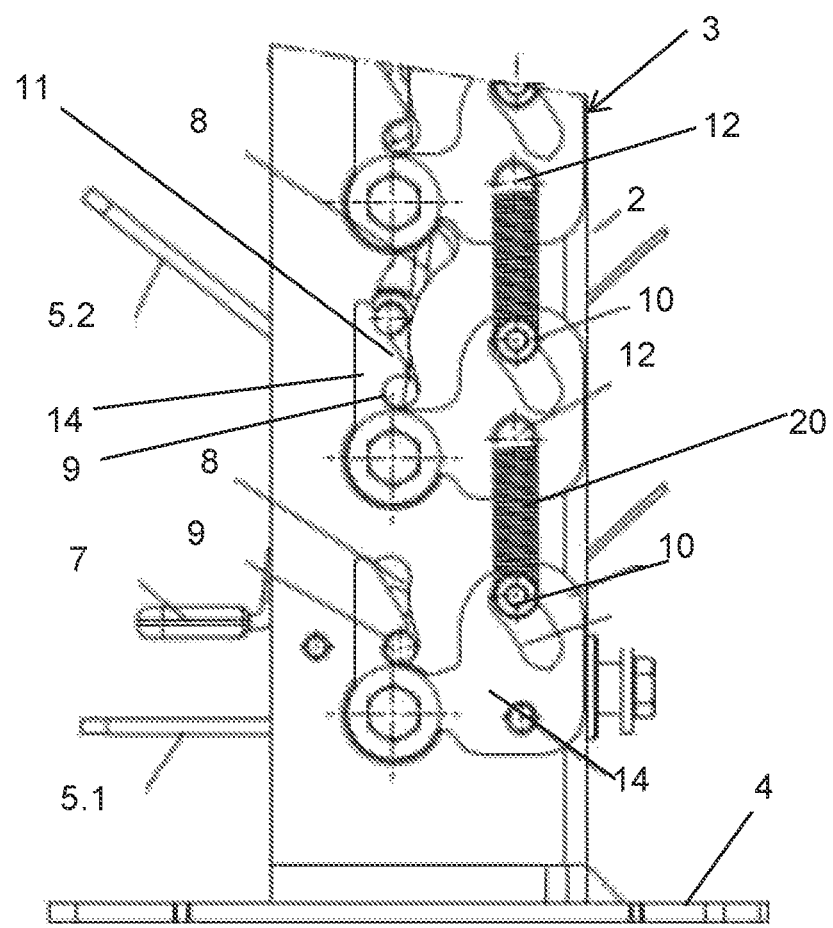
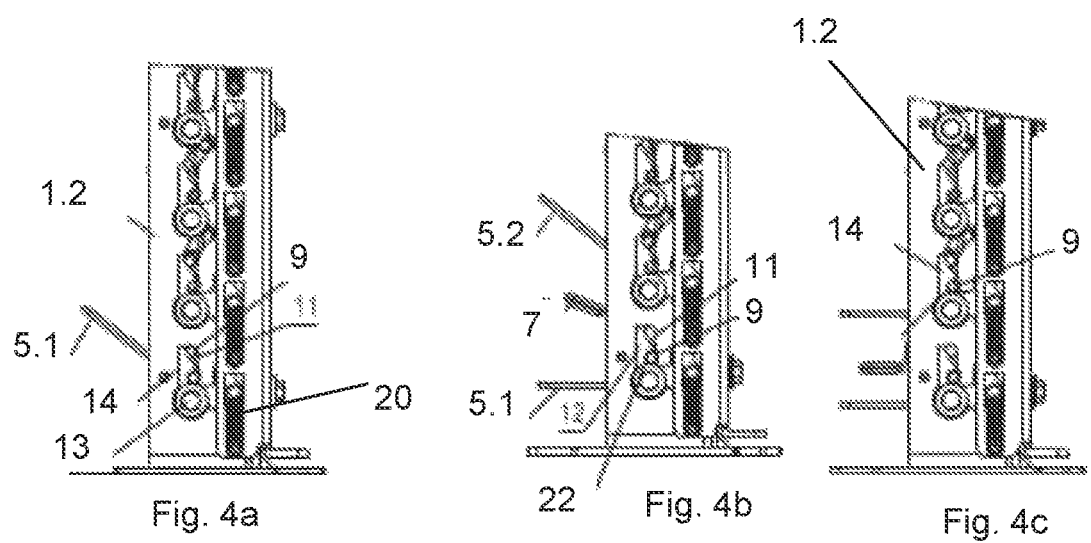
Fig. 4a    Fig. 4b    Fig. 4c

STACKING COLUMN

CROSS-REFERENCE TO RELATED APPLICATIONS

This application claims priority to German Patent Application Numbers DE 10 2023 104 100.2 filed Feb. 20, 2023 and DE 10 2024 104 243.5 filed Feb. 15, 2024, which are incorporated herein by reference in their entireties.

TECHNICAL AREA

The invention relates to a stacking column for storing stored goods according to the general term of claim 1.

STATE OF THE ART

Such stacking columns or pawls integrated in them are known, for example, from DE 38 11 310 C2. In most cases, these are vertical stacking columns arranged in a square. For technical reasons, however, it may also be advisable to arrange these stacking columns at an angle, as shown in DE 41 33 464 A1. It is also possible to arrange the stacking columns horizontally, for example according to DE 40 20 864 A1.

With all these stacking columns, the stored goods rest in or on the support arms of ratchet levers, whereby there is a risk of the stored goods being displaced. This disadvantage is particularly unfavorable if the stacking columns are designed to be transportable. Shifting on the support arms can also cause damage to the stored goods. For this reason, attempts are made to additionally secure the stored goods on the stacking columns. According to DE 196 47 578 A1, this can be achieved by providing an intermediate pawl between two adjacent pawl levers, which, after the stored goods have been placed on or against one pawl lever, can be placed on or against the stored goods on the other side of the one pawl lever by the pivoting movement of another pawl lever.

Furthermore, many stacking columns are designed so that the successive clinics are connected to each other via a linkage so that their movement is interdependent. In the working position, these clinches are then only held by the linkage or the stored goods.

Task of the Invention

The task of the present invention is to ensure an improved fixing of the pawls in their working position.

Solution to the Task

The features according to claim 1 lead to the solution of the problem.

The stacking column according to the invention for storing stored goods one above the other or next to each other at mutual intervals on a pawl enables the individual pawls lying one above the other or next to each other to be locked individually. In this case, the pawls are initially mounted between two side walls rotatably on an axle bolt, wherein the two side walls form a U-body with a common rear wall, wherein the U-body comprises a foot plate, wherein the pawl has a linkage bolt, wherein the linkage bolt is movable within a straight or curved slot of the side wall and thus mobilizes the pawl. In this context, mobilized means that the pawl is first moved from a resting position to a ready position and then to a working position. The exception to this is the first or lowest pawl. This is the pawl that is closest to the footplate. As a rule, the lowest pawl does not have a resting position, but is either in the ready position or in the working position.

The above-described mobilization of the pawl takes place via a linkage, which determines the position of the pawl from a resting position via a ready position into a working position and back again, whereby the linkage is operatively connected to the linkage bolt.

According to the invention, the linkage bolt is extended through at least one of the side walls, whereby the linkage bolt slides along an bevel of a locking link from the ready position into the working position, thereby moving the locking link from an initial position into a locking position. The working position is always reached at the same time as the respective locking position of each individual pawl is reached. The advantage of locking each individual pawl separately is that the stacking column can also be partially loaded without the unused pawls also having to be pushed into the working position. In the case of partial loading, only those pawls that are required are actually brought into the working position by the load. This facilitates subsequent handling during the removal of the load in a production hall.

The locking link is arranged between the side wall and a slider, whereby the locking link has an axis of rotation and a spring fixation. The locking link is connected to the side wall via the axis of rotation. This gives it the functionality to swivel back and forth between the two movably arranged components, namely the pawl and the slider on the non-movable part, namely the U-body.

A coil spring is arranged between the spring fixing and an anchor point. The spring fixation is rod-shaped and protrudes at right angles from the locking link and, when installed, protrudes through a recess in the slider away from the locking link and through the recess in the slider. The coil spring is arranged between the anchor point and the spring fixation. This arrangement ensures that the locking link is always swung back to the same position when unlocked and locked.

The locking link forms a bolt receptacle between the bevel and the axis of rotation. The shape of the linkage bolt and the bolt receptacle must be matched to each other. This means that it should always be possible for the linkage bolt to slide in and out of the bolt receptacle without catching. Preferably, the bolt receptacle is a pitch circle and the linkage bolt is a component with a matching circular cross-section. However, other conceivable shapes are also oval or polygonal if the above-mentioned functionality is still given.

As part of the functionality, the linkage bolt slides along the bevel to the bolt receptacle, whereby the pawl actuates the locking link on its way from the ready position to the working position and the coil spring absorbs a force, whereby the linkage bolt slides into the bolt receptacle when the pawl reaches the working position, whereby the coil spring releases the force. As a result, when a load is picked up, not only is the linkage automatically actuated to bring the next pawl into the ready position, but the locking link is also activated at the same time.

The slider is preferably a corner profile and is arranged at the transition from the side wall to the rear wall. However, it can also be just a strip profile or U-profile to achieve the same functionality. What is important here is that the shape and size of the slider must be adapted to the shape and size of the U-body.

The slider is arranged along the side wall or the U-body so that it can be moved towards or away from the foot plate to a defined extent. The slider is arranged in such a way that it has a slider spring in relation to the side wall or the rear wall, whereby the slider can be moved against the force of the slider spring and the recess unlocks the locking link via the spring fixation. This enables quick and easy locking of all pawls at once, as it is not necessary to overcome the sum of all the coil springs of the locking links, but only the force of the slider spring.

The foot plate has an unlocking recess, whereby the slider has an unlocking tongue above the unlocking recess. This enables automatic actuation of the pusher to unlock all pawls at once, for example by placing an elevation or a pin on the base, which reaches through the unlocking recess when the stacking column is set down and pushes the unlocking tongue away from the base or the foot plate, thereby unlocking the pusher solely by the weight of the stacking column and the stored goods and making it ready for removal in production.

Each pawl has its own axle bolt. The axle bolt has an axle bolt spring that grips the axle bolt and rests against the rear wall with one spring strut and rests against the pawl or the linkage bolt with another spring strut. When unlocking all pawls, the axle bolt spring serves to push the linkage bolt out of the bolt receptacle of the locking link and bring it into operative connection with the bevel so that the pawl can swing back from the working position to the resting position when the load has been removed. Again, the exception to this is that the bottom pawl moves back from the working position to the ready position.

The invention has the advantage that each individual pawl is locked individually. First and foremost, the pawls are each moved from their resting position to a ready position and then from a ready position to the working position by connection to a linkage. In the working position, however, they are then locked separately and individually by a locking element.

In a preferred embodiment of the invention, this locking element is a hook of the locking linkage, which is fixed to at least one side wall via an axis of rotation. This hook is pivotable in such a way that it can, for example, engage over a linkage bolt which protrudes from the pawl. Of course, there could also be a recess in the pawl into which a locking element engages. Many possibilities are conceivable here, which are to be covered by the present invention.

The hook should preferably be actuated by the movement of the pawl. If, for example, the linkage bolt is selected as an abutment, the hook has an bevel along which the linkage bolt can slide and thus rotate the hook around its axis of rotation until the linkage bolt finally moves into a pin receptacle and the hook engages over the linkage bolt. This locking mechanism is simple and secure.

To support the rotational movement of the hook around its axis of rotation and to securely fix the pawl position in which the hook engages over the linkage bolt, a force accumulator is provided, against the force of which the hook is rotated, for example when the linkage bolt slides on the bevel. For the sake of simplicity, this force accumulator is a coil spring. The connection to the coil spring is made via an extension which is connected to the hook on the other side of the axis of rotation. For the sake of simplicity, this extension can be in the form of a plate, but has the option of connecting the force accumulator. A simple pin that is connected to the energy store is sufficient here. When the hook is turned, the energy store is tensioned and then pulls the hook over the linkage bolt when the linkage bolt of the pawl slides into the bolt receptacle. This locking mechanism cannot be released even if the stacking column is subjected to considerable shocks during transportation.

One of the main advantages of this selected force accumulator is that there is no accumulation of spring forces. Each hook has its own force accumulator that actuates it. This is particularly true for unlocking, as the preferred method of unlocking all pawls is to use a slider that is moved vertically along the side wall. The above-mentioned pins, to which the coil spring is attached, pass through a recess in the slider, so that a lower edge of the recess engages this pin when the slider is pushed, which in turn rotates the hook around its axis of rotation via the above-mentioned extension. Since the force accumulator at the other end of the pin is connected to the slider, no additional force has to be applied when the slider is moved and, in particular, no summation of the spring forces of the coil spring has to be overcome. This is an advantage of the present invention, especially when a plurality of pawls have to be actuated.

FIGURE DESCRIPTION

Further advantages, features and details of the invention can be seen from the following description of preferred embodiments and from the drawings, which show in:

FIG. 3 is a side view of the stacking column similar to FIG. 2;

Figure 1:
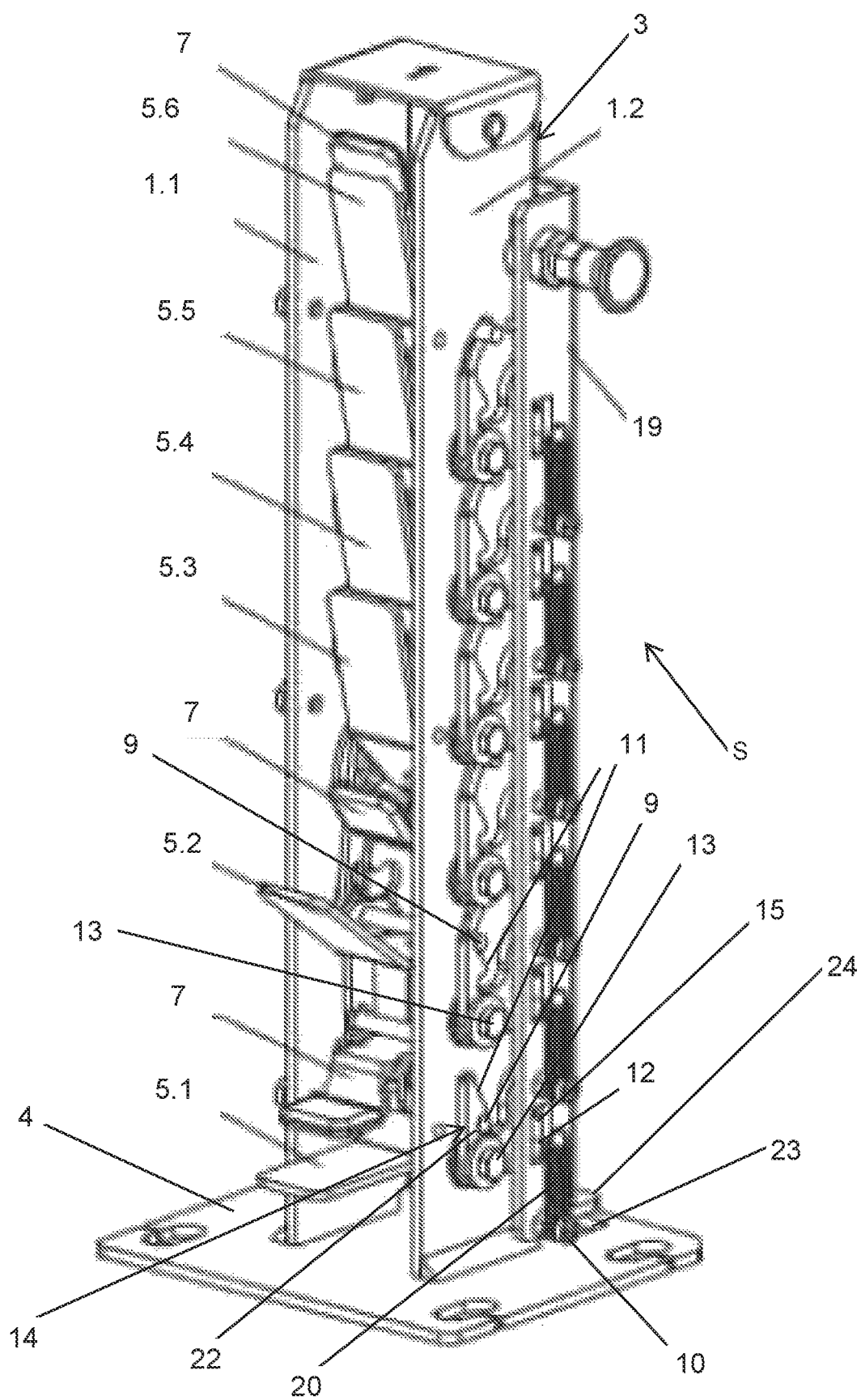
FIG. 1 is a perspective view of a stacking column according to the invention.

FIG. 4*a*) to 4*d*) are a side view of the stacking column according to FIG. 1 in various positions of use.

DETAILED DESCRIPTION OF THE INVENTION

FIG. 1 shows a stacking column S in which a plurality of pawls 5.1 to 5.6 are located between two side walls 1.1 and 1.2. Both side walls 1.1 and 1.2 are connected by a rear wall 2 (see FIG. 3) to form a U-body 3. This U-body 3 sits on a foot plate 4.

With regard to the arrangement of the pawls and their activity, reference is also made in particular to DE 20 2020 104 669 U1. In the present embodiment example, the lowest pawl 5.1 is also in the working position, while the next pawl 5.2 is in the ready position.

The lowest pawl 5.1 is operatively connected to the following pawls 5.2 and 5.3 via a linkage 6 (see FIG. 2), the latter being located in the resting position between the side walls 1.1 and 1.2. Reference is also made to the aforementioned DE 20 2020 104 669 U1 with regard to the design of the linkage 6.

Furthermore, clamping pawls 7 or hold-down devices are also shown, which press the load against the pawl 5.1-5.6 in the position of use and thus in particular counteract vibration during transportation. For example, such clamping pawls 7 are shown in DE 197 29 444 B4. However, they play no role in the present invention.

As also described in EP 3 231 740 A1, the pawls 5.1-5.6 are each connected to the opposing side walls 1.1, 1.2 via an axle bolt, whereby the pawls 5.1-5.6 rotate around the axle bolt. For the sake of clarity, the axle bolts are not shown here, but, as in EP 3 231 740 A1, they are located in the area of the transition from the rear wall 2 of the U-body 3 to the side walls 1.1 or 1.2, whereby the axle bolt is arranged between the two side walls 1.1, 1.2.

The stacking column S shown is used to store stored goods on top of each other or next to each other at mutual intervals on one of the pawls 5.1-5.6, which is rotatably mounted on the axle pin between two side cheeks 1.1, 1.2.

The axle bolt, which is not shown in detail, has an axle bolt spring that surrounds the axle bolt and rests against the rear wall 2 with one spring leg and rests against the pawl or the linkage bolt 9 with another spring leg. The axle bolt spring is used to pull the pawl 5.1-5.6 back from the working position into the ready position.

The side walls 1.1, 1.2 form a U-body 3 with the common rear wall 2, whereby the U-body 3 comprises the foot plate 4. In this context, encompassed means that the U-body 3 is joined to the foot plate 4, for example by welding.

The pawl 5.1-5.6 has a linkage bolt 9. The linkage bolt 9 is movably mounted within a curved slot 8 of the side wall 1.1, 1.2. As a result, the pawl 5.1-5.6 is mobilized in conjunction with the linkage 6 within the specification of the curved elongated hole and can thus in turn be pivoted from the resting position first into the ready position and then into the working position.

Figure 2:
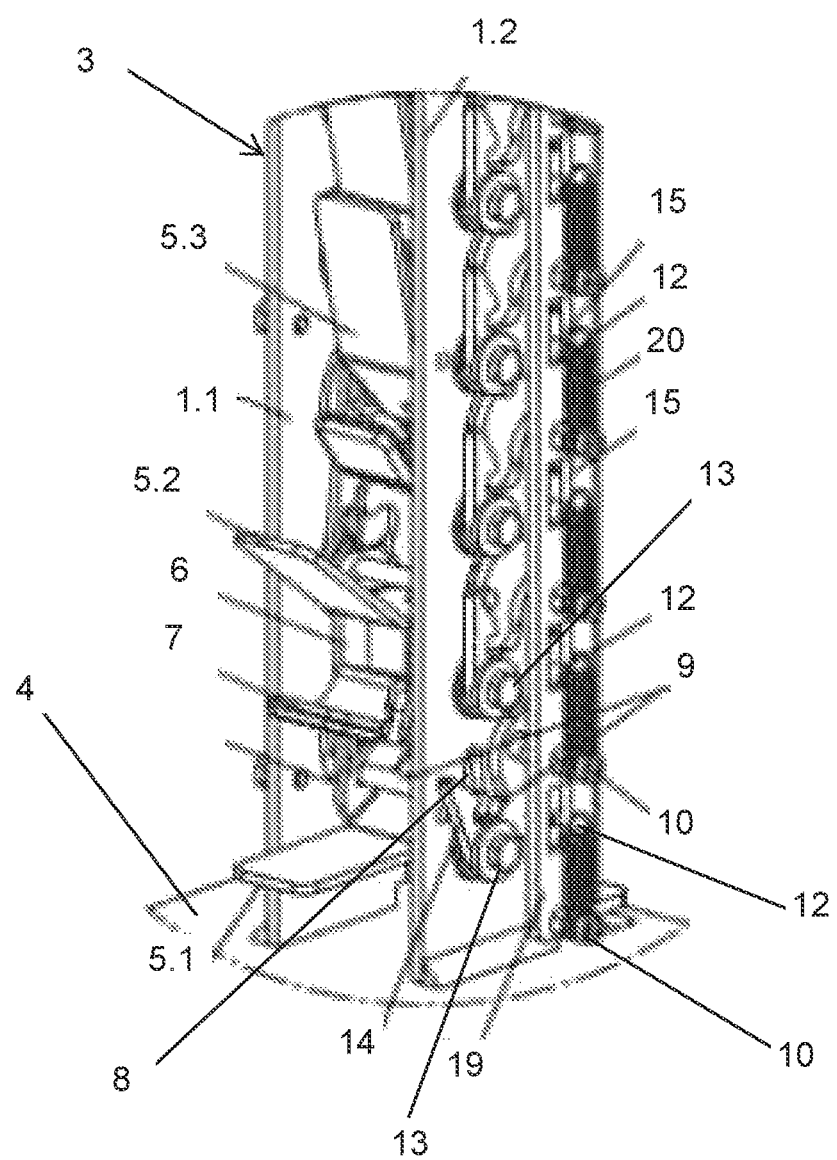
FIG. 2 is a slightly enlarged perspective view of the stacking column according to FIG. 1 in the ready position of the second pawl.

FIG. 2 also shows, for example, a linkage 6 that determines the position of the pawl 5.1-5.6 from a resting position via a ready position into a working position and back again, whereby the linkage 6 is operatively connected to the linkage bolt 9. The linkage 6 connects pawls 5.1-5.6 in a predetermined functionality and is sufficiently known from the prior art.

The linkage bolt 9 is extended through one of the side walls 1.1, 1.2, in this embodiment example through the side wall 1.2. As a result, when the pawls 5.1-5.6 are adjusted, which is accomplished by the interaction of the linkage 6 with the linkage bolt 9, the linkage bolt 9 is also simultaneously used to activate the locking mechanism by the locking link 14 of the individual pawls 5.1-5.6.

The linkage bolt 9 moves from the ready position into the working position along a bevel 11 of a locking link 14 and activates the locking link 14 from an initial position into a locking position.

The locking link 14 is arranged between the side wall 1.1, 1.2 or, in this example, between the side wall 1.2 and a slider 19.

In this design example, the slider 19 is a corner profile and is arranged at the transition from the side wall 1.2 to the rear wall 2.

The slider 19 is arranged to move along the side wall 1.2. However, the slider 19 comprises a slider spring in relation to the side wall 1.1, 1.2 or the rear wall 2, which is not shown in detail in the figures.

The slider 19 is arranged to move against the force of the slider spring, whereby the recess 15 brings the locking link 14 into an unlocking position via the spring fixation 12, i.e. unlocks it. This is achieved by the locking link 14 not being actuated by the linkage bolt 9 as in the locking process, but by the slider 19 being pushed away from the foot plate 4 and the recess 15 being entrained, whereby the recess 15 in turn entrains the spring fixation 12 and the locking link 14 performs an identical movement as in the locking process. Except that this time the coil spring 20 is not actuated, but instead the pivoting of the locking link 14 causes the axle bolt spring of the axle bolt of the pawl 5.1-5.6, which is not shown in detail, to pull the pawl 5.1-5.6 back out of the locked working position into the unlocked ready position.

The locking link 14 is connected to the side wall 1.1, 1.2 via an axis of rotation 13.

In addition to the axis of rotation 13, the locking link 14 also has a spring fixation 12, whereby a coil spring 20 is arranged between the spring fixation 12 and an anchor point 10.

The linkage bolt 9 is arranged in such a way that it slides along the bevel 11 up to a bolt receptacle 22, whereby the pawl 5.1-5.6 actuates the locking link 14 on its way from the ready position to the working position and the coil spring 20 absorbs a force, whereby when the pawl 5.1 reaches the working position (as shown, for example, in FIG. 1), the linkage bolt 9 slides into the bolt receptacle 22, whereby the coil spring 20 releases the previously absorbed force again. In FIG. 1, the pawl 5.1 is locked and the associated linkage bolt 9 is retracted into the bolt receptacle 22 so that the pawl 5.1 is locked.

At the same time, the pawl 5.2 is in the ready position and the associated linkage bolt 9 is again at the start of the associated bevel 11.

Furthermore, the locking link 14 forms a bolt receptacle 22 between the bevel 11 and the axis of rotation 13.

The spring fixation 12 is a rod element and projects away from the locking link 14 and through a recess 15 of the slider 19 away from the locking link 14 through the recess 15 of the slider 19, and the coil spring 20 is arranged between the anchor point 10 and the spring fixation 12.

The advantage of this design is that each of the pawls 5.1-5.6 has its own coil spring 20 for guiding and securing the locking mechanism, so that the force required for guiding the locking mechanism can be selected by selecting the force of the coil spring 20. Theoretically, it would even be possible to assign a different force-requiring coil spring 20 to each individual pawl 5.1-5.6.

FIG. 1 also shows that the foot plate 4 has an unlocking recess 23, with the slider 19 forming an unlocking tongue 24 above the unlocking recess 23. The background to this is that the pawls 5.1-5.6 are unlocked all at once by actuating the slider 19. For this purpose, there is an elevation or a pin or the like on a defined base, which engages through the unlocking recess 23 when the stacking column is set down and presses against the unlocking tongue 24 and thus pushes the slider 19 away from the base against the force of a slider spring on the U-body 3, which is not shown in detail.

The functionality of the lower pawl 5.1 to always return to the ready position as the starting position and not to be able to be returned to a resting position between the side walls 1.1, 1.2 is achieved by a stop that precisely prevents the lower pawl 5.1 from retracting between the two side cheeks 1.1, 1.2.

The mode of operation of the present invention is as follows and is explained in particular with reference to FIG. 4:

The initial position is shown in FIG. 4a, where the lower pawl 5.1 is in the ready position. Now, as shown in FIG. 4b, a load not shown in detail is placed on the pawl 5.1, whereby this pawl carries the clamping pawl 7 and the following pawl 5.2 via the linkage 6. The lowest pawl 5.1 reaches the working position, whereby the linkage bolt 9 runs along the bevel 11 on the locking link 14 and slides into an undercut bolt receptacle 22 in the end position. The locking link 14 rotates around the axis of rotation 13 and pulls the spring fixation 12 away from the foot plate 4. This pulls the bolt receptacle 22 over the linkage bolt 9. This locks the pawl 5.1.

When the next load is inserted between, for example, four similarly designed stacking columns S arranged in a rectangle, the following pawl 5.2 is now moved from the ready position to the working position via the linkage 6, as shown in FIG. 4c. The locking process is the same, so that the same reference symbols are used here. In this way, one pawl 5.1-5.6 after the other is loaded and locked. Locking each of the individual pawls 5.1 to 5.6 individually has the advantage that partial loading of the stacking column S is also possible without the unused pawls 5.1 to 5.6 also having to be pressed into the working position. In the case of partial loading, therefore, only those pawls 5.1 to 5.6 that are required are actually brought into the working position by the load.

Figure 4D:
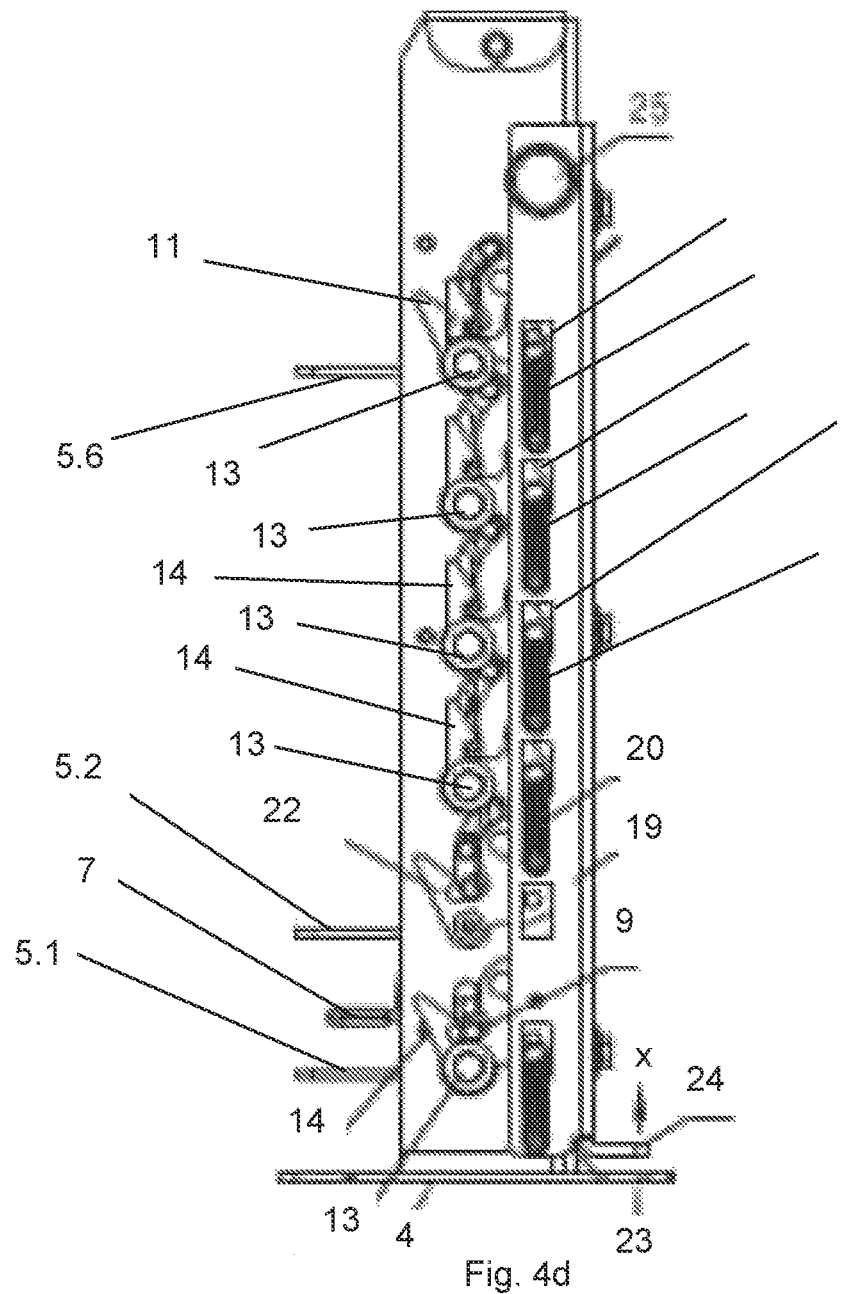

To unlock all of the pawls 5.1 to 5.6, the slider 19 shown in FIG. 4*d* is used. It is lifted in direction x, which can be done in any way. For example, the stacking column could be placed on a plunger (not shown) after transportation with a load elsewhere in a factory hall, which penetrates an unlocking recess 23 in the foot plate 4 and hits the unlocking tongue 24 on the slider 19 so that the slider 19 can be guided upwards along guide pins. A lower edge of the recess 15 (see FIG. 2) meets the spring fixation 12, which protrudes from the locking link 14. This lower edge takes the spring fixation 12 with it and thus rotates the locking link 14 about the axis of rotation 13 so that the linkage bolt 9 can extend out of the bolt receptacle 22.

As soon as all stored goods have been removed, any fixing of the slide 19 is released so that it falls vertically downwards again and the locking links 14 return to their initial position, as shown in FIG. 1, via the coil springs 20.

LIST OF REFERENCE SYMBOLS

| | |
|---|---|
| 1.1, 1.2 | Side wall |
| 2 | Back wall |
| 3 | U-body |
| 4 | Foot plate |
| 5 | Handle |
| 6 | Linkage |
| 7 | Clamping pawl |
| 8 | Curved slotted hole |
| 9 | Linkage bolt |
| 10 | Anchor point |
| 11 | Bevel |
| 12 | Spring fixation |
| 13 | Rotary axis |
| 14 | Locking link |
| 15 | Recess |
| 16 | |
| 17 | |
| 18 | |
| 19 | Slider |
| 20 | Coil spring |
| 21 | |
| 22 | Bolt mounting |
| 23 | Unlocking recess |
| 24 | Unlocking tongue |
| 25 | |
| 26 | |
| 27 | |
| 28 | |
| S | Stacking column |
| x | Lifting |

I claim:

1. A stacking column for storing stored goods one above the other or next to each other at mutual intervals on a pawl, which is rotatably mounted between two side walls on an axle pin, the two side walls form a U-body with a common rear wall, wherein the U-body comprises a foot plate, wherein the pawl has a linkage bolt, wherein the linkage bolt is movable within a curved slot of the side wall and thus is configured to mobilize the pawl, wherein the linkage bolt extends through one of the side walls, the linkage bolt is configured to slide from a ready position into a working position along a bevel of a locking link and to bring the locking link from an initial position into a locking position, the locking link is between the one of the side walls and a slider, wherein the locking link has an axis of rotation and a spring fixation, wherein a coil spring is arranged between the spring fixation and an anchor point, wherein the spring fixation is arranged through a recess of the slider away from the locking link through the recess of the slider and the coil spring is arranged between the anchor point and the spring fixation.

2. The stacking column according to claim 1, wherein the locking link defines a bolt receptacle between the bevel and the axis of rotation.

3. The stacking column according to claim 2, wherein the linkage bolt is configured to slide along the bevel as far as the bolt receptacle, the pawl is configured to actuate the locking link on its path from the ready position to the working position and the coil spring is configured to absorb a force in the process, the linkage bolt is configured to slide into the bolt receptacle when the pawl reaches the working position, and the coil spring is configured to release the force.

4. The stacking column according to claim 2, wherein the locking link is connected to the one of the side walls via the axis of rotation.

5. The stacking column according to claim 1, wherein the slider is a corner profile and is arranged at a transition of the one of the side walls to the rear wall.

6. The stacking column according to claim 1, wherein the slider is movable along the one of the side walls.

7. The stacking column according to claim 1, wherein the slider has a slider spring that is arranged with respect to the one of the side walls or the rear wall, the slider is movable against the force of the slider spring, the recess is configured to unlock the locking link via the spring fixing.

8. The stacking column according to claim 1, wherein the foot plate has an unlocking recess, the slider has an unlocking tongue above the unlocking recess.

9. The stacking column according claim 1, wherein an axle bolt has an axle bolt spring which is around the axle bolt and is configured to bear against the rear wall with one spring leg and is configured to bear against the pawl or the linkage bolt with a second spring leg.

10. The stacking column according to claim 1, wherein a linkage is configured to determine a position of the pawl pivotably from a resting position via the ready position into the working position and back again, the linkage being operatively connected to the linkage bolt.

* * * * *